(No Model.) 7 Sheets—Sheet 1.

A. F. GODEFROY.
RAILWAY.

No. 355,927. Patented Jan. 11, 1887.

Attest:
J. W. Hoke.

Inventor:
Alexander F. Godefroy
by C. D. Moody, atty (No Model.) 7 Sheets—Sheet 2.

A. F. GODEFROY.
RAILWAY.

No. 355,927. Patented Jan. 11, 1887.

Attest:
J. W. Hoke.
F. L. Stoddard

Inventor:
Alexandre F. Godefroy
by C. D. Moody
atty (No Model.) 7 Sheets—Sheet 3.
A. F. GODEFROY.
RAILWAY.
No. 355,927. Patented Jan. 11, 1887.
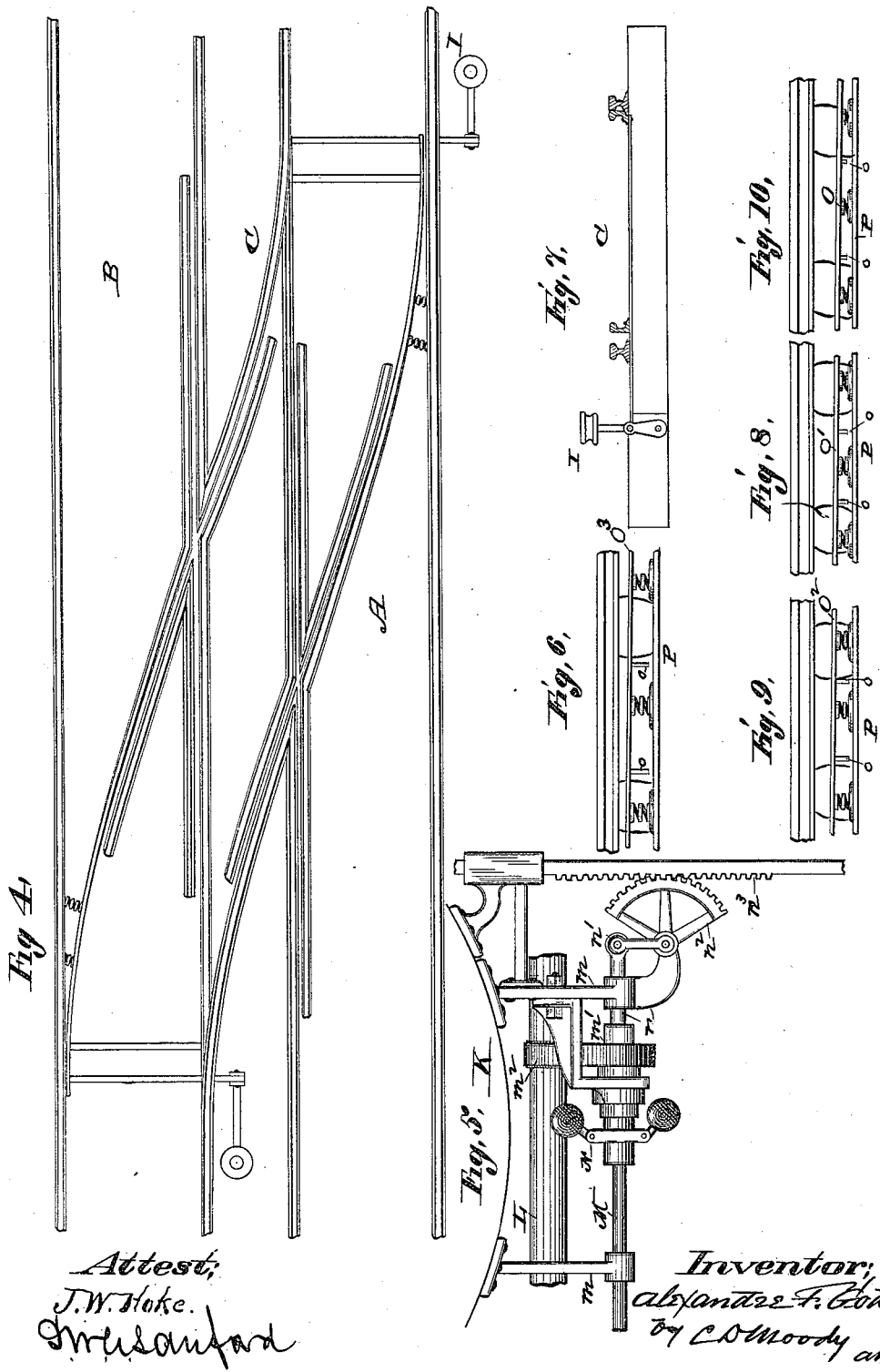
Attest:
J. W. Hoke.
[signature]
Inventor:
Alexandre F. Godefroy
by C. O. Moody atty

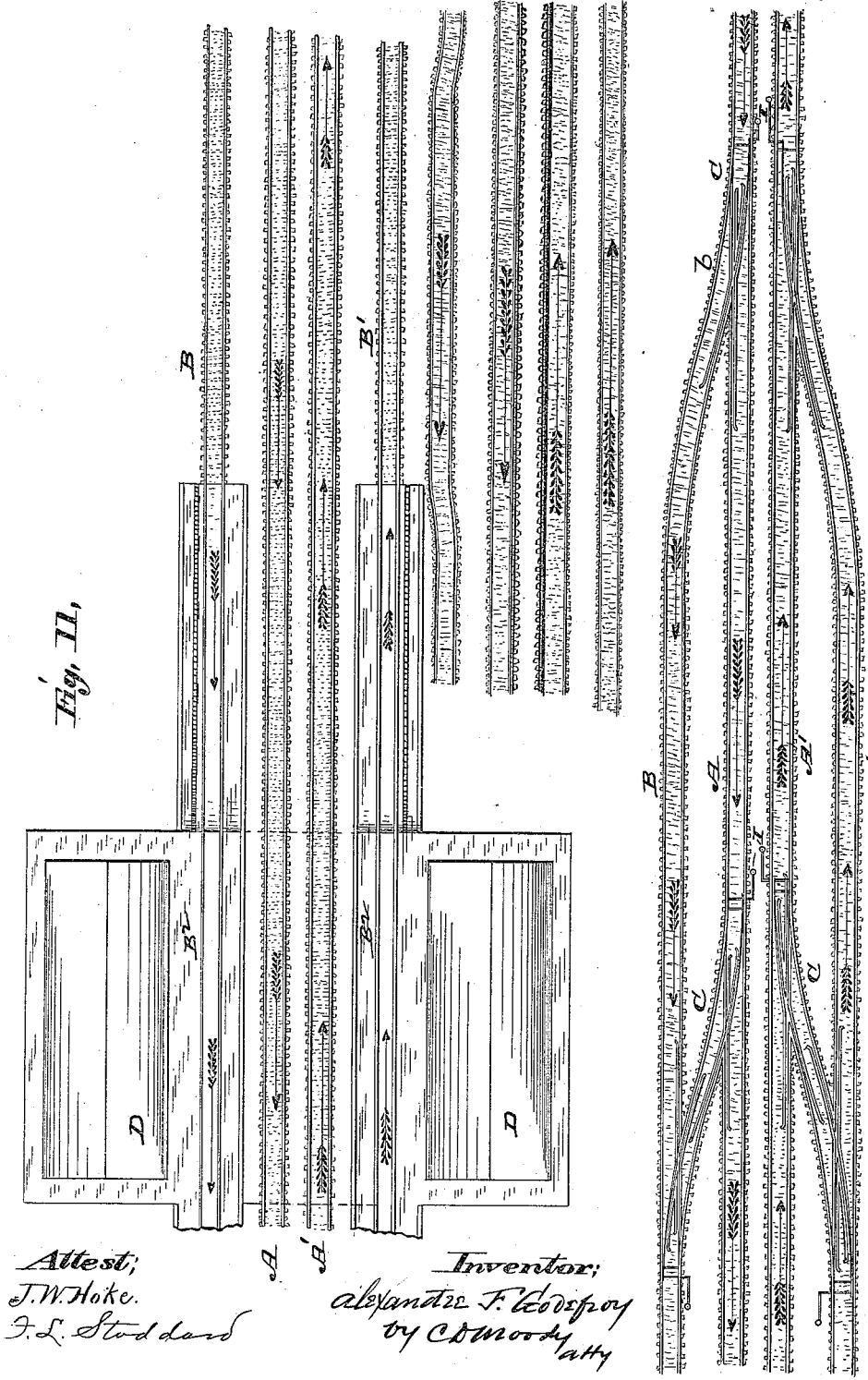

(No Model.) 7 Sheets—Sheet 5.
A. F. GODEFROY.
RAILWAY.
No. 355,927. Patented Jan. 11, 1887.
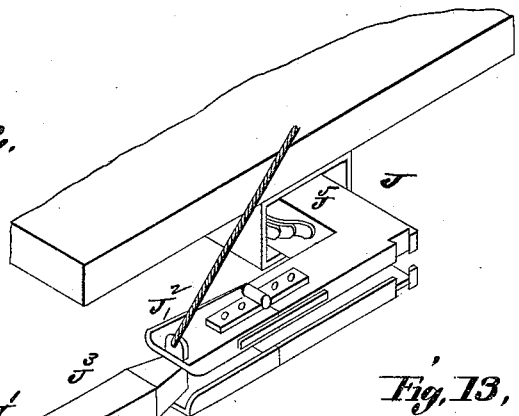
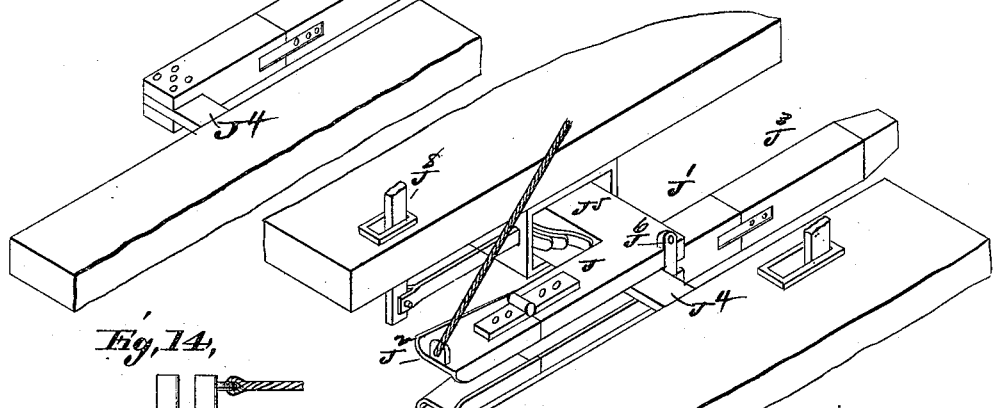
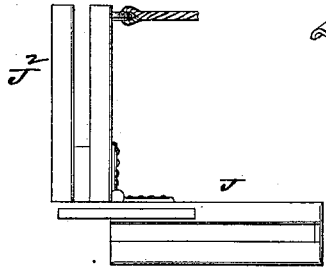
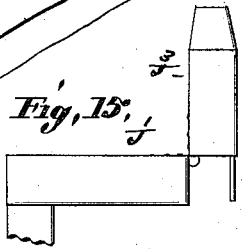
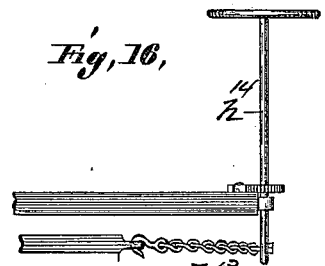
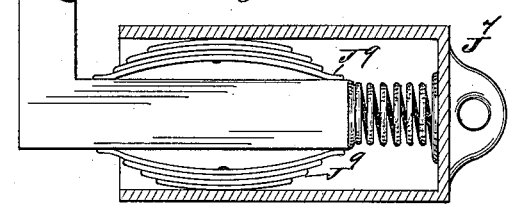
Attest:
J. W. Hoke.
J. L. Stoddard
Inventor;
Alexander F. Godefroy
by C. D. Moody, atty (No Model.) 7 Sheets—Sheet 6.

A. F. GODEFROY.
RAILWAY.

No. 355,927. Patented Jan. 11, 1887.

Attest:
J. W. Hoke.
N. B. Anderson.

Inventor;
Alexander F. Godefroy
by C. D. Moody
atty (No Model.) 7 Sheets—Sheet 7.
A. F. GODEFROY.
RAILWAY.
No. 355,927. Patented Jan. 11, 1887.
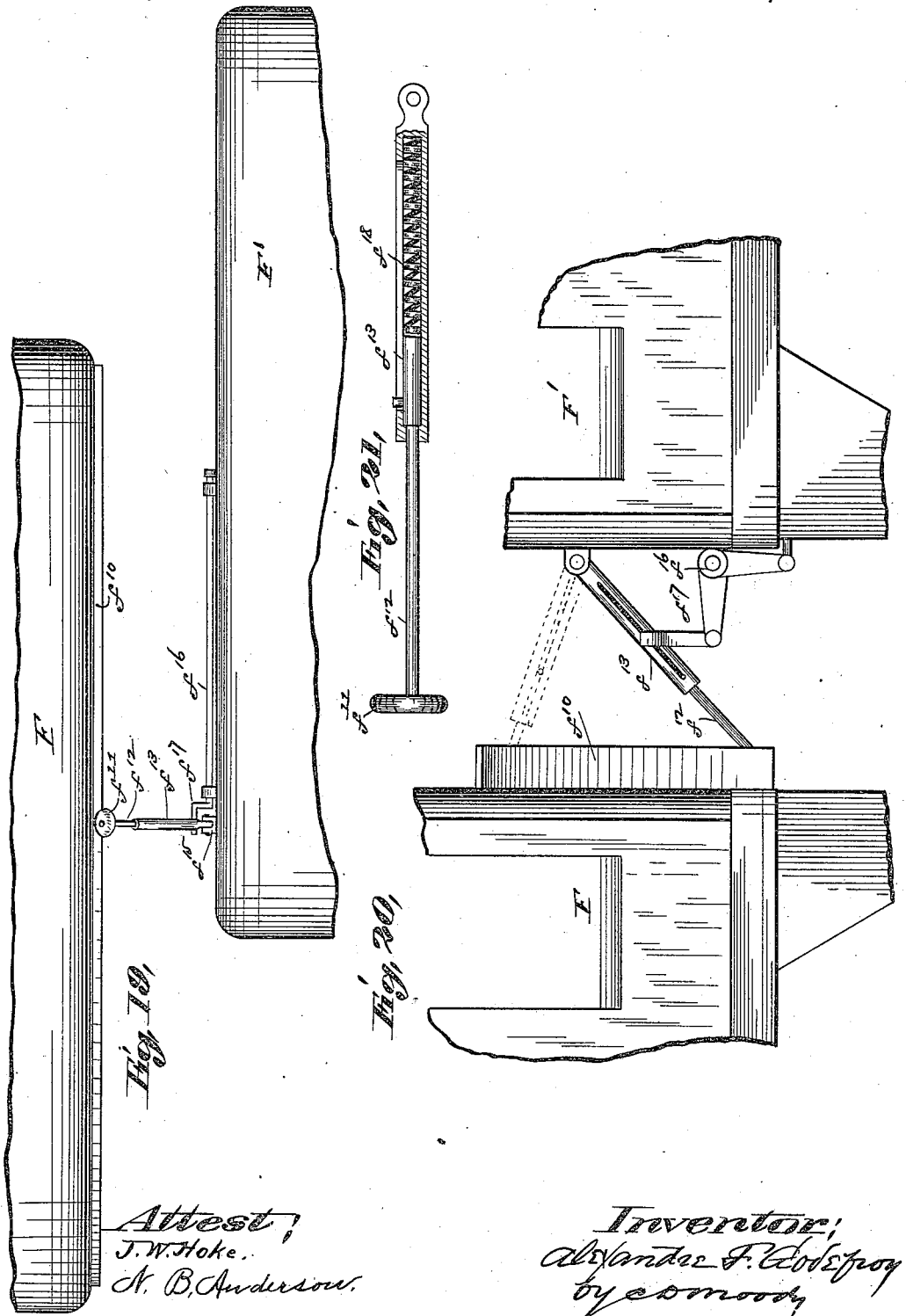

UNITED STATES PATENT OFFICE.

ALEXANDRE F. GODEFROY, OF ST. LOUIS, MISSOURI.

RAILWAY.

SPECIFICATION forming part of Letters Patent No. 355,927, dated January 11, 1887.

Application filed February 8, 1886. Serial No. 191,115. (No model.)

*To all whom it may concern:*

Be it known that I, ALEXANDRE F. GODEFROY, of St. Louis, Missouri, have made a new and useful Improvement in Railways, of which the following is a full, clear, and exact description.

The design of the improvement, which relates in part to the method of railway transit, partly to the track, and partly to the cars, is to provide means whereby a railway passenger-train, without checking, or materially checking, its speed, or without stopping its motion, can discharge and receive passengers at the various stations along the line of the railway.

The annexed drawings, making part of this specification, exhibit the various features of the improvement.

Figure 1:
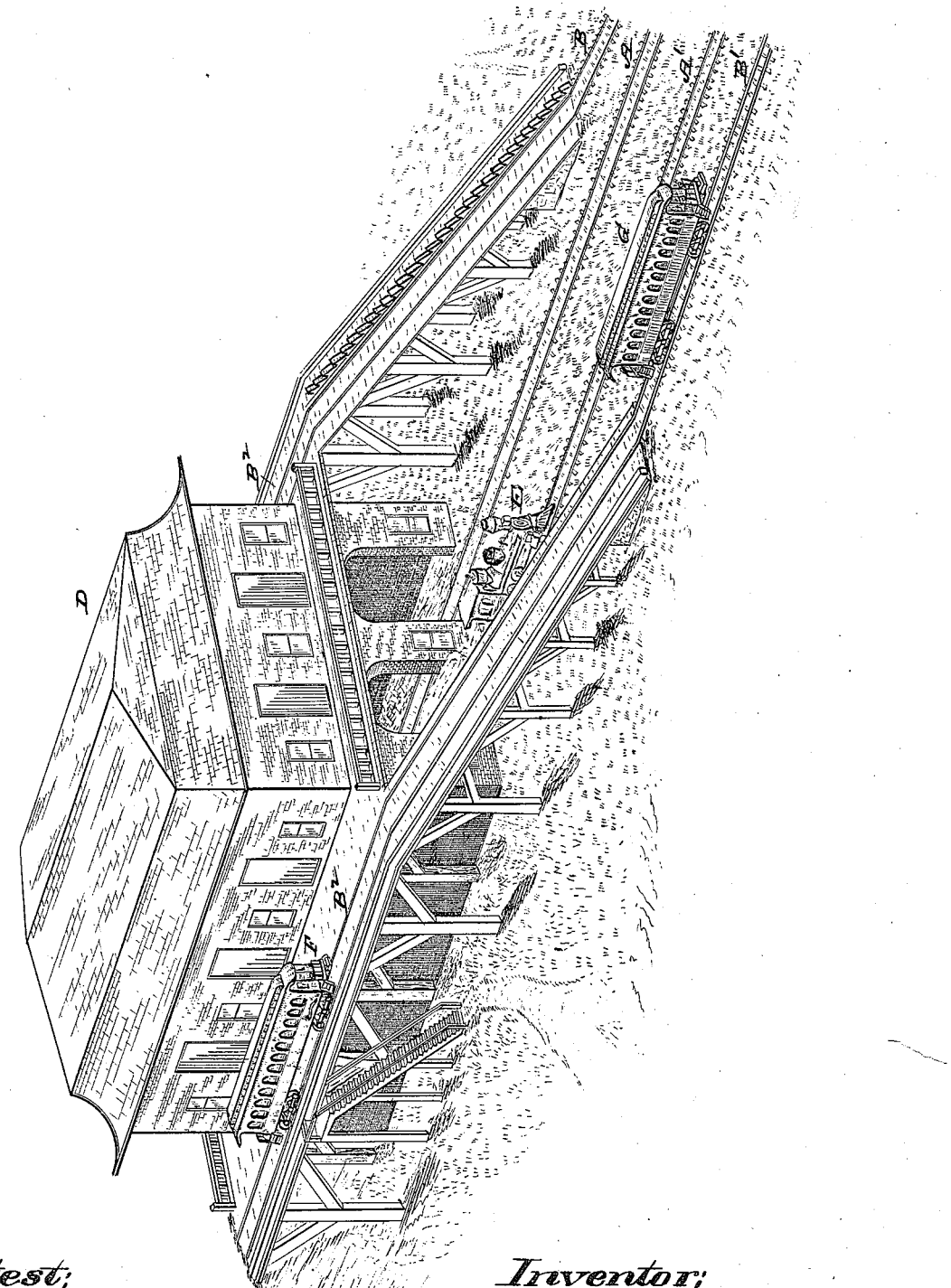
Figure 2:
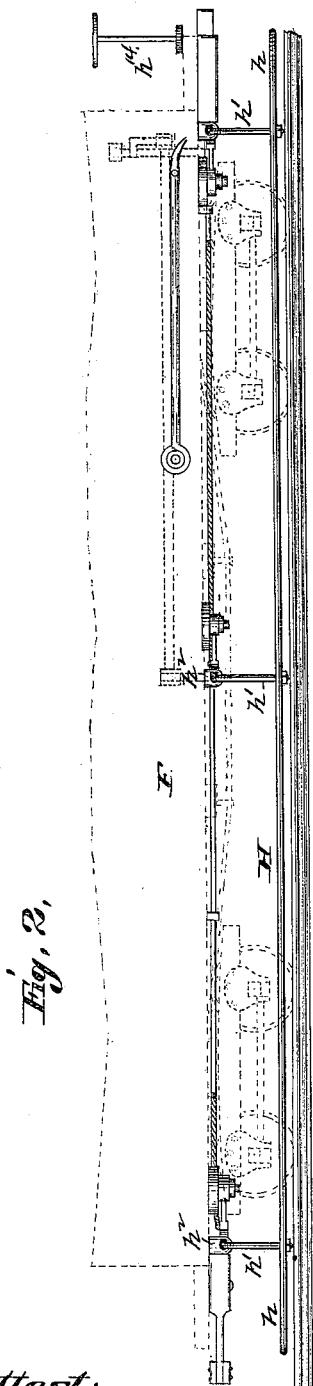
Figure 3:
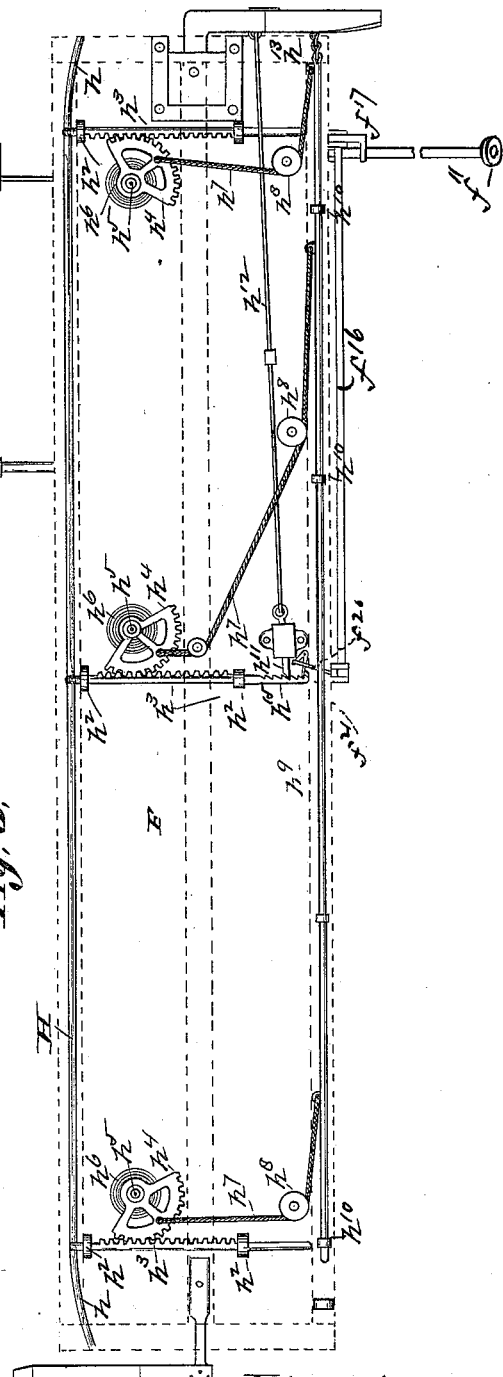
Figure 18:
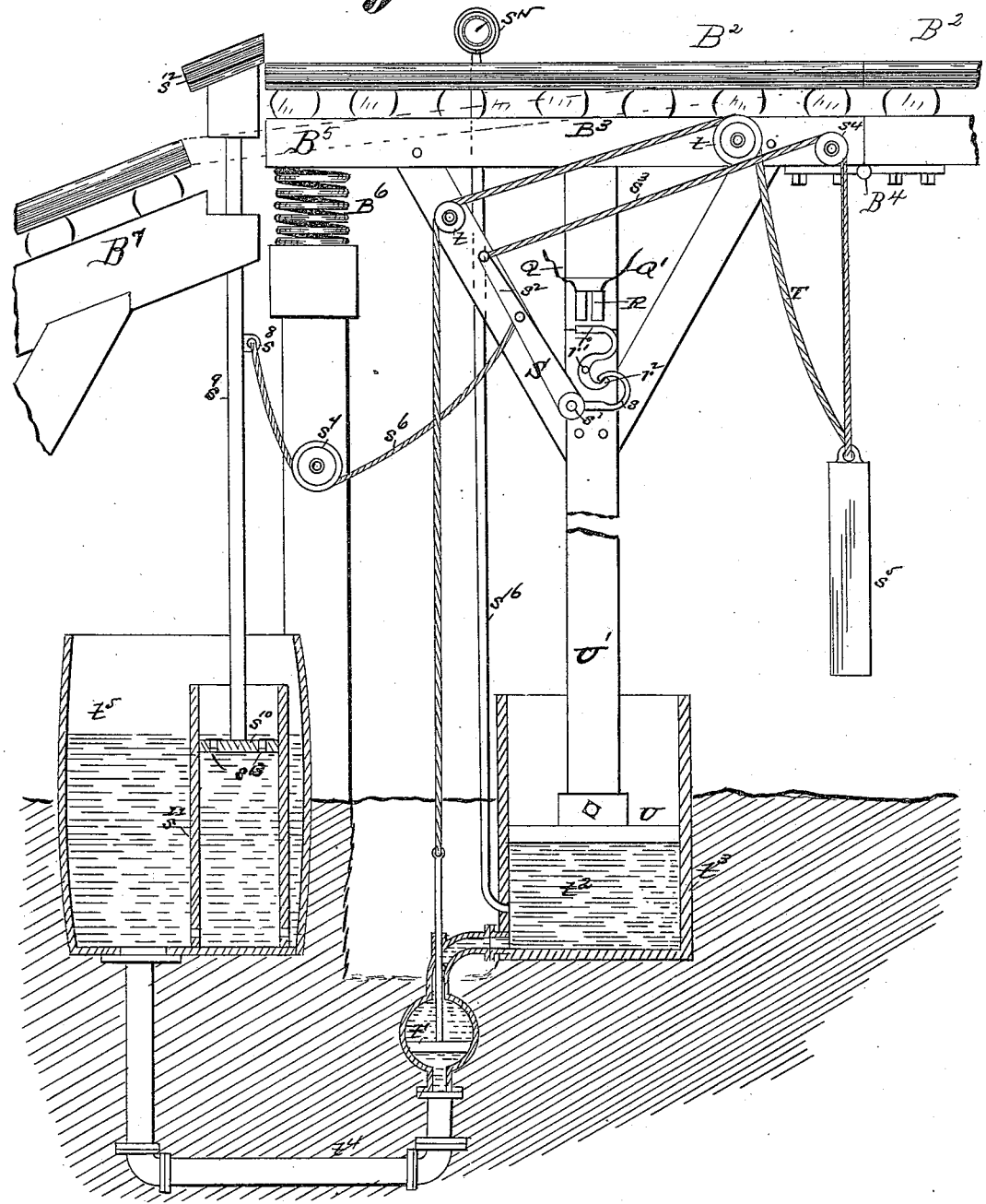

Figure 1 is a view in perspective showing, in a general way, the construction of the improved railway at one of its stations. Fig. 2 is a side elevation of a car (indicated by the broken lines) having the mechanism for operating the track-switch and for coupling and uncoupling. Fig. 3 is a bottom view of the car. Fig. 4 is a plan of one of the track-switches. Fig. 5 is a detail, being an end elevation of the mechanism attached to the locomotive. Figs. 6, 8, 9, 10 are details, being side elevations of portions of the track and showing the mechanism used in communicating from the moving train to the station ahead for the purpose of starting the car therefrom. Fig. 7 is a cross-section of the track at one of the switches. Fig. 11 is a plan of the improved railway. This figure, for convenience, is made in sections. Fig. 12 is a view in perspective showing the draw-heads of two opposing cars, the draw-heads being about to engage with each other. Fig. 13 is a view similar to that of Fig. 12, the draw-heads being engaged. Fig. 14 is a front elevation of one of the draw-heads, its outer end being upturned. Fig. 15 is a plan of the other of the draw-heads, its outer end being turned. Fig. 16 is a side elevation showing the mechanism used in setting the car-switch arm. Fig. 17 is a horizontal section of one of the draw-head frames. Fig. 18 is a side elevation, partly in section, of the mechanism used at a station in connection with the mechanism shown in Figs. 5, 6, 8, 9, 10. Fig. 19 is a plan showing opposing sides of two cars on the side and main tracks, respectively. Fig. 20 is an end elevation of the same, and Fig. 21 is a detail.

The same letters of reference denote the same parts.

A, Figs. 1, 11, represents a main line of track, and A' represents another main line, forming an ordinary double-track railway, saving as its construction is modified by the improvement.

B represents a side track, connected at its ends *b* and by means of switches C with the main line A. But one end *b* of the side track, B, and one switch C are shown in the drawings, the other end and the other switch being substantially similar. B' represents a similar side track similarly connected with the main line A'. The side tracks are used at the various stations along the line of railway.

D, Figs. 1, 11 represents one of the stations. The grade of the side tracks, after leaving the main tracks at one side of the station, ascends somewhat rapidly to the station, at which point the side tracks are considerably—in practice, say 20 feet—above the level of the main tracks. Opposite the station the side tracks are, as indicated in Fig. 1, substantially level. From the station the grade of the side tracks descends somewhat rapidly to the level of the main tracks, with which they ultimately and respectively connect.

To facilitate an understanding of the improvement in its details, the method involved and the general operation of the apparatus may here be described. The passengers for the station which the train is approaching are assembled in the rear car of the train. Before the train reaches the switch belonging to the track upon which the train is moving that rear car is detached from the remainder of the train, which now gains on the detached car and sufficiently for the detached car to be switched onto the side track. The main portion of the train passes the station. The momentum of the detached car carries that car up the grade of the switch and brings it to the station at the superior level above named, where its motion can be and is arrested and its passengers can be discharged. Meanwhile another car at the station upon the side track has been receiving passengers for the train, and as the main portion of the train passes the station on the main track it (the receiving-car) is started in the direction of the passing train down the grade from the station. By reason of the downward grade the receiving-car acquires a sufficient rate of motion to enable it to come alongside the moving train and ultimately pass through the switch at that end of the side track and so as to connect with the rear end of the train, which in its movement is made to pass the switch far enough in advance of the receiving-car to enable that car to be switched onto the main track, and as the rear end of the train passes (in case it does pass the receiving-car or the receiving-car laps at all upon the train) a peculiar coupling, hereinafter described, can be brought into requisition to facilitate the union of the receiving-car with the main portion of the train. As the receiving-car is thus sent away from the station the incoming car above described as having been detached from the train, switched onto the side track, and arrested at the station, in turn becomes a receiving-car for the next passing train, and so on. The same system of cars and method of operation are employed upon the opposite track, A', for discharging and receiving passengers traveling in the opposite direction.

In Fig. 1, E may represent the locomotive of a passing train; F, the car detached therefrom and containing the passengers for the station D, and G the car which has received the passengers from the station. To effect the described movements of these cars, there must be provision by which the car when detached can automatically open the switch and be carried onto the side track; for, while it is practicable to switch the car by means of attendants stationed at the switches, it is desirable to be able to dispense with such service. To this end, and as the most desirable means therefor, the car F, Figs. 2, 3, is provided with what may be termed the "car-switch arm" H. It is in the form of a rail extending alongside the car near the ground, with its ends $h\ h$ slightly bent inward, and it is adapted to be moved sidewise toward and from the car, in order that the arm may, after the car is detached from the remainder of the train, be moved outwardly from the car, and so as to encounter a pivoted or otherwise movable lever, I, Figs. 4, 11, 7, which is connected with and in its movement adapted to open the switch C—that is, the car-switch arm moves the lever I, and the switch is thereby opened and the car directed onto the switch. The arm H is attached to the arms $h'$, which extend upward and then horizontally through bearings $h^2$ attached to the car, and through which the arms $h'$ are adapted to be moved longitudinally. The arms $h'$ are each provided with a rack, $h^3$, with which a toothed segment, $h^4$, pivoted at $h^5$, engages. A spring, $h^6$, operates to rotate the segment when released in the direction to cause the car-switch arm to be moved outward from the car, and the car-switch arm is drawn in the opposite direction by means of the ropes $h^7$, which lead from the segments, around the bearings $h^8$, to the rod $h^9$. This rod is held and adapted to be moved longitudinally in the bearings $h^{10}$, and when the rod is drawn to the right, as shown in Figs. 2, 3, the car-switch arm is moved inward toward and preferably to beneath the car-body, and it is held in that position by means of the dog $h^{11}$. This last-named part is conveniently operated from the end of the car, and by means of the rod $h^{12}$, and when the rod is drawn forward or toward the end of the car the dog is released and the car-switch arm is moved outward from the car. The rod $h^9$ is drawn longitudinally, so as to cause the car-switch arm to be moved inward by means of the chain $h^{13}$ and upright shaft $h^{14}$, Fig. 2. The strain upon the rod $h^9$ can be released as soon as the dog $h^{11}$ has engaged in the notched portion $h^{15}$ of the cam $h'$. The switch C is a split switch, and the lever I, when moved by the car-switch arm, acts to operate the switch in the ordinary manner.

After the car has been detached and run in the manner described up onto the elevated portion $B^2$, Figs. 1, 11, 18, of the side track and its passengers discharged, the car is shifted farther along upon the platform $B^2$ and onto the farther portion $B^3$, Fig. 18, thereof, and whence, with the passengers it has received at the station, it is started downward again to join the passing train. This elevated portion $B^2$ may be a fixture and rigid, and the car may be delivered therefrom by any suitable means. A desirable method is exhibited in Fig. 18. As there shown the part $B^3$ is hinged at $B^4$ to the fixed part of the platform, and its free end $B^5$ is upheld by a spring, $B^6$, which in turn is supported upon some fixed part. When the car is rolled onto the part $B^3$ the end $B^5$ drops, causing the part $B^3$ to assume an inclined position, and the car in consequence to move onto the incline $B^7$, and thence to the main track, as described.

Figs. 12, 13, &c., illustrate the coupling mechanism. J represents the draw-head upon the car in advance, and J' represents the draw-head upon the car in the rear and to be coupled to the first-named car. The part J' is adapted to be slipped (in a lateral direction with reference to the track or car) into the part J, as indicated by the two positions shown respectively in Figs. 12 and 13. The outer ends, $J^2\ J^3$, respectively, of the parts J J' are, and preferably by hinging them to the inner portions of the draw-head, made extensible, and as the car descends from the station-platform the extensions are opened out, as in Fig. 12, and when thus opened out the part J comes up from behind and laps against the part J' and receives the part into it. At the same time the car-switch arm of the rear car is brought into operation, and the switch C at that end of the side track B is brought into union with the main track, and the rear car is thereby guided into line with the car in front, and as the rear car is thus brought into line its draw-head J' is slipped farther into the draw-head J, and, finally, into the position of Fig. 13, in which position the longitudinal part $J^4$ of the draw-head J' is in line with the longitudinal part $J^5$ of the draw-head J. The cars are now regularly coupled and the train made up for the next station.

The removable stop $J^6$, Fig. 13, prevents the draw-heads from moving farther past each other; but when, as in uncoupling and detaching a car for any station, the stop $J^6$ can be removed, and then by swinging the two draw-heads upon their inner ends, $J^7$, Fig. 17, and in the opposite directions, which can be done by means of the levers $J^8$, Fig. 13, the draw-heads can be uncoupled, after which the levers $J^8$ can be released, and the springs $J^9$ act to swing the draw-heads back again into a straight position.

As a train approaching a station may vary in its speed, it is desirable for the engineer to be able to start the receiving-car from the station in time to unite with the train. To this end the locomotive is provided with a device such as is shown in Fig. 5, in which view K represents the boiler-shell; L, the locomotive-axle; M, a counter-shaft, attached by brackets $m\ m$ to the shell, and carrying a pulley, $m'$, over which passes a belt, $m^2$, which is also carried around the axle. The counter-shaft is also furnished with a governor, N, which is driven by the belt $m^2$. The governor-spindle $n$, by means of the bell-crank $n'$, turns a toothed segment, $n^2$, which engages with an upright and vertically-adjustable rack, $n^3$. The faster the rate at which the locomotive is traveling the faster the rack is depressed. Alongside the track is an inclined bar, or rather a series of bars, O O' $O^2$ $O^3$, Figs. 6, 8, 9, 10, the bars being elastically upheld and at different heights from a base-plate, P. Wires Q Q', Fig. 18, lead from a magnet, R, and connect, respectively, with the bars O O', &c., and the base-plate P. The bars O O', &c., are spaced at different distances from the station, the lowest bar, O, being the farthest away, and so on. The rack $n^3$, when depressed by the action of the governor, encounters the bar O, &c., or that one of the series O O', &c., according to the rate at which the locomotive is going—if faster, it encounters those farther away from the station, if slower, those nearer the station. The rack $n^3$ causes the rods O O', &c., to be depressed, and by means of the points $o$ to establish an electric circuit with the base-plate P. The magnet R then acts to draw the armature $r$ and to turn it on its pivot $r'$, Fig. 18, and thereby release the lever S, whose end $s$ is adapted to hook onto the armature-extension $r^2$, and whose pivot is at $s'$, and whose end $s^2$ is, by means of the cord $s^3$, passing over the pulley $s^4$, connected with the weight $s^5$. The weight then drops and draws with it the cord T, which passes over the bearings $t$ and is connected with the valve $t'$. This valve, by the dropping of the weight $s^5$, is unseated, permitting the water $t^2$ to flow from the cylinder $t^3$ through the pipe $t^4$ into the reservoir $t^5$. This in turn permits of the descent of the plunger U and the plunger-rod U'. This last-named part supports the part $B^3$ of the station-platform, and thus the starting of the car away from the station can be controlled by the movement and the position of the locomotive. As soon as the circuit is broken the magnet releases the armature, the springs $B^6$ act to raise the free end of the platform-section, and the plunger U now acts to draw the water from the reservoir back again, through the pipe $t^4$, into the cylinder $t^3$, and the parts last above described resume their former positions, ready for the sending away of the next car.

An additional feature of this portion of the improvement is the following: The lever S, by means of the cord $s^6$, passing around the bearing $s^7$ and attaching to the rod $s^9$ at $s^8$, acts when tilted by the weight $s^5$ to draw down a section, $s^{12}$, of the railway-track. When this section is in its elevated position, (shown in Fig. 18,) it serves as a stop to prevent a car from accidentally running off the platform $B^3$; but when the section is drawn down it serves to complete the track between the part upon the platform $B^3$ and the inclined portion shown at the left in Fig. 18. The rod $s^9$ is supported by the float $s^{10}$, which floats in the water in an inclosed portion, $s^{11}$, of the reservoir $t^5$, and thereby upholds the track-section $s^{12}$ in the position shown. The float is perforated at $s^{13}$, to enable it to readily pass down into the water when the rod $s^9$ is drawn downward.

Another feature is exhibited in Figs. 19, 20, 21. The car F at one side has an inclined plane, $f^{10}$. The car F' upon the opposite side has an arm, $f^{13}$, provided with a rubber roller, $f^{11}$. The arm is pivoted to the car at $f^{15}$, so that it can be turned upward and downward, as indicated by the full and broken lines in Fig. 20. The roller is not attached directly to the arm $f^{13}$, but to an extension, $f^{12}$, which, by compressing the spring $f^{18}$, Fig. 21, can be pushed into the part $f^{13}$. When the car F' comes alongside the car F the roller $f^{11}$ rolls upward on the inclined plane $f^{10}$ until the upper end thereof is passed, whereupon the roller and arm $f^{13}$ drop into the position shown in the full lines in Fig. 20, and in doing this the arm $f^{13}$ encounters the crank $f^{17}$ of the rock-shaft $f^{16}$, Figs. 3, 19, 20, which is journaled horizontally alongside the car F, and is provided with the rod $f^{20}$, Fig. 3, which operates the dog $f^{21}$. This dog engages in the toothed portion $h^{15}$ of the bar $h^3$, and when it is disengaged therefrom the switch-bar is moved out to operate the switch, as before.

This last-described mechanism can be used, in combination with the other mechanism shown in Fig. 3, for detaching the switch-arm. The gage $s^{15}$, by means of the tube $s^{16}$, Fig. 18, is used to determine the pressure within the cylinder $t^3$ as the water acts to compress the air within the tube $s^{16}$.

I claim—

1. In railway transit, a method of receiving and discharging freight, consisting in detaching from a moving train the car containing the freight to be discharged, switching said car onto a side track, continuing uninterruptedly the motion of the train, starting in the direction of motion of such train a car containing the freight to be received, switching said car onto the main track in rear of the said train, and coupling said car to the train, substantially as set forth.

2. In railway transit, the method herein described of receiving and discharging freight, consisting in detaching a car from a moving train, continuing uninterruptedly the motion of said train, imparting from said moving train the starting impulse to the car to be added thereto, and subsequently connecting the last-named car to the said train, substantially as set forth.

3. In railway transit and in a method comprising the collection of cars while the train is in motion, the improved step herein described, consisting in imparting the starting impulse to the car to be received from the moving train to which such car is to be added, substantially as set forth.

4. The combination of the car F, having the switch-arm H extended approximately the full length of the car, with the tracks A B, the switch C, and the lever I, as described.

5. The car having the switch-arm H extended approximately the full length of the car and movable laterally, as and for the purpose described.

6. The combination of the car F, the switch-arm H, the arms $h'$, having the rack $h^3$, the pivoted toothed segment $h^4$, and the spring $h^6$, substantially as described.

7. The combination of the car F, the switch-arm H, the arms $h'$, the racks $h^3$, the segments $h^4$, the springs $h^6$, the ropes $h^7$, the bearings $h^8$, the rod $h^9$, the chain $h^{13}$, and the shaft $h^{14}$, substantially as described.

8. The combination of the car F, the switch-arm H, the arms $h'$, having the notched portion $h^{15}$, and the dog $h^{11}$, substantially as described.

9. The combination of the elevated track having a fixed portion and a portion, $B^3$, hinged at one end to the fixed portion and having its opposite end movable vertically, and the incline having its upper end arranged adjacent to the movable end of the portion $B^3$, substantially as set forth.

10. The combination of the elevated track $B^2$, having the hinged portion $B^3$, the incline $B^7$, and the springs $B^6$, as described.

11. The combination of the draw-head J with the draw-head J', one of said draw-heads being made to slip laterally into the other, substantially as described.

12. The draw-head J, whose outer portion, $J^2$, is made to be turned upward and downward, as and for the purpose described.

13. The draw-head J', whose outer portion, $J^3$, is made to be turned, substantially as and for the purpose described.

14. The combination of the draw-heads J J' and the stop $J^6$, as and for the purpose described.

15. The combination of the draw-heads J J', the stop $J^6$, and the levers $J^8$, as described.

16. The combination of the car F, the swinging draw-head, and the side springs, $J^9$, as described.

17. The combination of the locomotive having the axle L, the counter-shaft M, the pulley and belt, the governor N, the bell-crank, the toothed segment, and the vertically-adjustable rack with the bar or bars O, substantially as described.

18. The combination of the locomotive having the rack with the bar or bars $O' O^2 O^3$, the wires Q Q', and the magnet R, as and for the purpose described.

19. The combination of the bar O, having the points $o\ o$, and the base-plate P with devices upon the locomotive or train to time the starting movement of the car F, as described.

20. The combination of the magnet R, the armature $r$, the lever S, the cord $s^3$, extended and weighted as described, the cord T, the valve $t'$, the cylinder $t^3$, the pipe $t^4$, the reservoir $t^5$, the plunger U, the movable platform, and the springs $B^6$, as described.

21. The combination of the bar S, the cord $s^6$, the rod $s^9$, and the section $s^{12}$, as and for the purpose described.

22. The combination of the gage $s^{15}$, the tube $s^{16}$, the cylinder $t^3$, and the plunger U, as and for the purpose set forth.

23. The combination of the cars F F', the inclined plane $f^{10}$, the arm $f^{13}$, the roller $f^{11}$, the rock-shaft $f^{16}$, the rod $f^{20}$, the dog $f^{21}$, and the bar $h^3$, as and for the purpose described.

ALEXANDRE F. GODEFROY.

Witnesses:
C. D. MOODY,
N. B. ANDERSON.